United States Patent [19]

Smith et al.

[11] Patent Number: 4,572,372

[45] Date of Patent: Feb. 25, 1986

[54] RADIOACTIVE WASTE MULTIPLE CONTAINER SYSTEM

[75] Inventors: Ronald J. Smith, Shillington; L. David Garman, Kutztown; W. Evans Reynolds, Reinholds, all of Pa.

[73] Assignee: Gilbert Associates, Inc., Reading, Pa.

[21] Appl. No.: 397,552

[22] Filed: Jul. 12, 1982

[51] Int. Cl.[4] .................... B65D 21/02; B65D 25/10
[52] U.S. Cl. .................................. 206/511; 206/504; 206/512; 220/21
[58] Field of Search .................. 206/504, 511, 512; 220/21

[56] References Cited

U.S. PATENT DOCUMENTS

| 2,635,786 | 4/1953 | Wickson | 206/511 |
| 3,116,701 | 1/1964 | Stough | 206/511 |
| 3,709,163 | 1/1973 | Smedley | 206/511 |
| 4,287,997 | 9/1981 | Rolfe | 206/511 |

FOREIGN PATENT DOCUMENTS

| 140404 | 3/1949 | Australia | 206/512 |
| 1124420 | 2/1962 | Fed. Rep. of Germany | 206/504 |
| 1508153 | 11/1967 | France | 206/504 |
| 792963 | 4/1958 | United Kingdom | 220/21 |
| 432065 | 8/1975 | U.S.S.R. | 206/504 |

Primary Examiner—George E. Lowrance
Attorney, Agent, or Firm—William J. Ruano

[57] ABSTRACT

A radioactive waste multiple container system which provides a simplified method whereby a plurality of drums can be placed in a remote, unmanned storage facility in one materials handling sequence, as opposed to a plurality of separate materials handling sequences, such as required for individual drums utilizing a remotely-controlled materials handling system. The multiple container system also functions as an interim storage system in that it will allow for stacking up to a total of ten levels high. Each container interlocks with each successive unit, through automatic, passive alignment of the individual container with the previously placed unit, while being handled completely by remote control. This interlock and alignment feature insures greater stack stability, substantially increasing the overall storage efficiency of the remote storage facility. While a "6-pack" container system has been described, a 4, 8, 10, 12 etc. system may be used instead.

2 Claims, 4 Drawing Figures

RADIOACTIVE WASTE MULTIPLE CONTAINER SYSTEM

This invention relates to a system and container unit for handling and storing radioactive waste.

An outstanding advantage of present units and systems is that they involve an abnormal number of remotely-controlled materials handling procedures for placing radioactive waste in unmanned storage or staging facilites, thereby making it unsafe from the standpoint of excessive radiation exposure.

Another disadvantage is that such procedures require very substantial space requirements.

An object of the invention is to overcome the above-named disadvantages by greatly minimizing the remotely controlled materials handling procedures, by increasing personnel safety in terms of radiation exposure, and by optimizing storage space requirements.

Other objects and advantages of the invention will become more apparent from a study of the following description taken with the accompanying drawing wherein.

Figure 1:
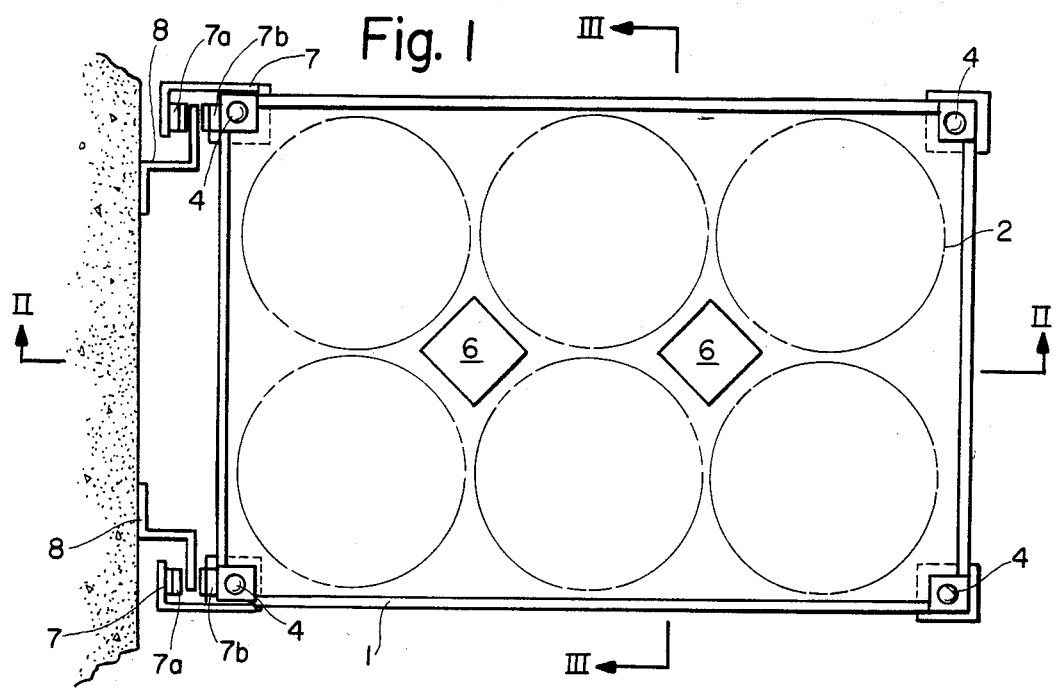
FIG. 1 is a plan view of a six-pack container system embodying the present invention.
Figure 2:
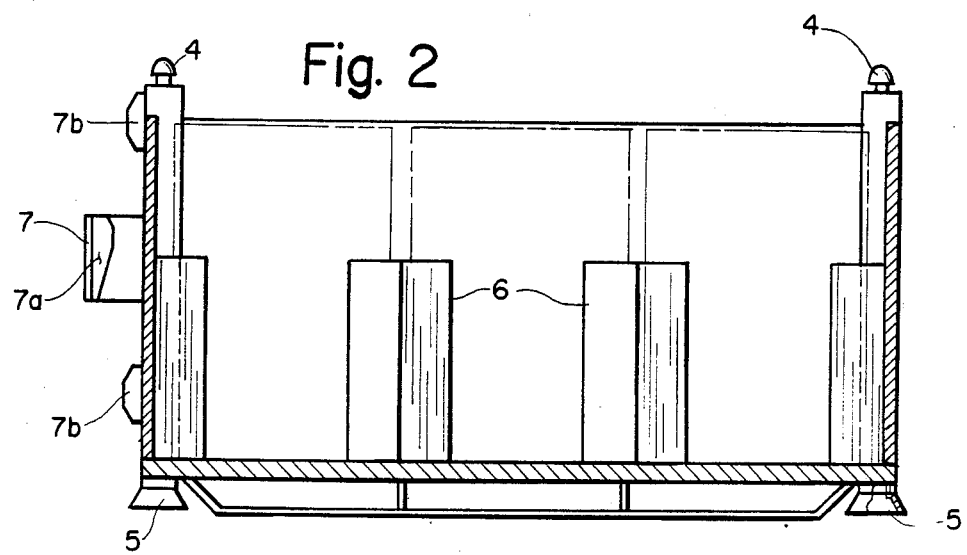
FIG. 2 is a cross-sectional view taken along the line of II—II of FIG. 1.
Figure 3:
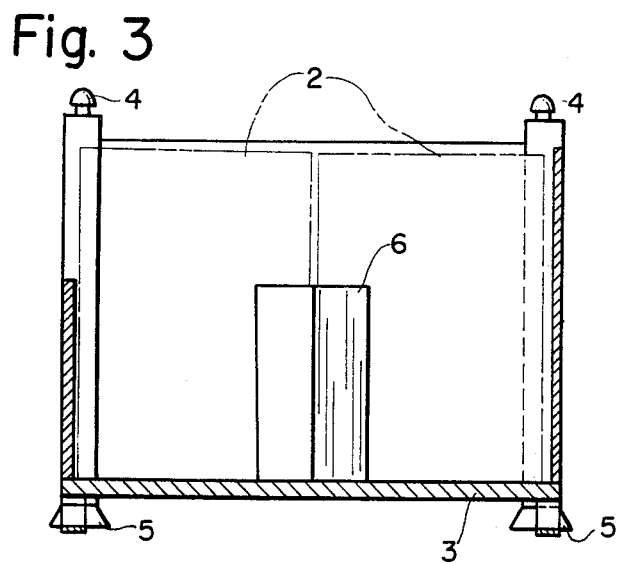
FIG. 3 is a transverse cross-sectional view taken along line III—III of FIG. 1
Figure 4:
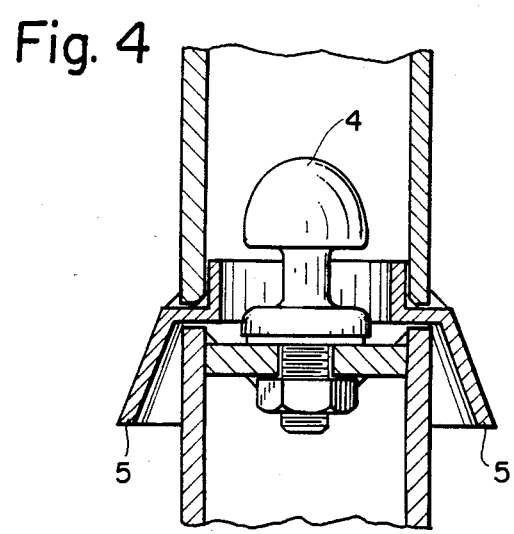
FIG. 4 is a cross section of socket 5.

Referring more particularly to the drawing, the multiple container system of the present invention is a rectangular storage container 1 provided with integral lifting and alignment devices that are sized to accommodate a plurality of individual drums 2.

As an example, a "6-pack" container is illustrated, although it should be understood that the invention is applicable to other numbers, such as 4, 8, 12 etc. The maximum exterior dimensions of the "6-pack" container system, based on the drum sizes, are preferably as follows:

Length, about 6'10"; width, about 4'5"; and height, about 4'1".

The nominal design load capacity of the container system may be about 6,000 lbs. and each container is capable of supporting up to nine loaded containers placed on top of it.

Sufficient ground clearance between the lowest support member and the supporting surface 3 of the container 1 is provided for fork-lift truck or other pallet materials handling equipment access. The upper alignment devices are of any suitable construction, such as solidly mounted ball 4 located on the top of the four exterior upright support members. The alignment devices are designed in a manner so that they both provide alignment and function as lifting points for container handling.

The lower alignment devices, such as spherical sockets 5, are located at the base of the four exterior upright support members, and are designed such that they provide both automatic, passive guidance and alignment (i.e. without visual contact with the container interface) with the upper alignement devices as well as support for the containers.

The container system can be constructed of any combination of the following structural shapes (excluding alignment or guidance devices): The corner and lower supports are preferably of structural steel tubing, angles, beams, channels, cylinders or bars.

The intermediate supports are preferable of plate steel, steel wire or any of these used for corner supports.

The sides and base are of plate steel, corrugated steel, steel wire fabric.

The materials used in construction are preferably carbon steel or alloy steel of sufficient strength to support all anticipated loads.

The multiple container system is preferable of welded construction with overall dimension tolerance of ¼ inch in any direction as measured with the container empty and fully loaded.

It is preferably provided with a factory applied finish suitable for exposure in an environment of 40°–104° F., up to 100% humidity.

The multiple container system can be sized up to accommodate drums or cylindrical containers having other dimension (larger or smaller), or rectangular metal or wood boxes. Internal spacers are provided to prevent drum toppling or sliding when the system is partially filled. They are preferably hollow. The sides of the containers system can be modified to allow for horizontal loading by remote devices.

External guidance devices 7 together with guides 7a, 7b which slide on flanges 8 fixed to a wall, can be provided for the containers system to aid in remote stacking of units and to increase overall stack stability.

This it will be seen that the multiple containers system of the present invention comprises a container unit for radioactive waste that minimizes the remotely-controlled materials handling procedures for placing radioactive waste in unmanned storage or staging facilities, provides increased personell safety in terms of radiation exposure, and optimizes the storage space requirements.

While I have illustrated and described a single embodiment of my invention, it will be understood that this is by way of illustration only and that various changes and modifications may be comtemplated by my invention and within the scope of the following claims:

We claim:

1. In a system for handling and storing radioactive waste, a rectangular metallic container with an open top for containing a plurality of drums, drum stabilizers in the form of hollow metallic posts of substantially square horizontal cross-section rigidly mounted on the bottom of said container and extending upwardly about midway of the height of said container in spaced relationship along the central longitudinal axis of said container adjacent each of said drums to prevent drum toppling or sliding, alignment means in the form of ball and socket joints extending upwardly and downwardly, respectively, at the four corners of said container to facilitate stacking, a pair of vertical rail means comprising flanges of L shape fixed to a stationary vertical wall, and a pair of guide means extending horizontally outwardly from two adjacent corners of said container for cooperating with said vertical rail means to facilitate stacking with lateral stationary wall support, each of said guide means comprising upper and lower cam shaped guides in vertical alignment for contacting one surface of said flanges of L shape and a central channel with an inner cam shaped liner for contacting the opposite surface of said flanges, whereby containers may be vertically stacked with increased stack stability from support of said vertical wall.

2. In a system as recited in claim 1 wherein said alignment means comprises four hollow posts at the corners of said container and wherein each of said ball joints comprises a horizontal web welded in each of said four corner hollow posts of said container, the ball rigidly fastened centrally of each web, and wherein each socket is in the form of an outwardly flared truncated cone having an intermediate shoulder which closely fits the bottom of each corner post.

* * * * *